United States Patent [19]

Gray, II et al.

[11] Patent Number: 4,773,177

[45] Date of Patent: Sep. 27, 1988

[54] METHOD OF PREPARING AN ANIMAL LURING SITE

[75] Inventors: Hanley Gray, II; John F. Hendrickson, both of Pineville, Ky.

[73] Assignee: HanBurn, Inc., Pineville, Ky.

[21] Appl. No.: 924,690

[22] Filed: Oct. 29, 1986

[51] Int. Cl.⁴ .............................................. A01K 31/06
[52] U.S. Cl. .................................................. 43/1; 43/2
[58] Field of Search ............................................ 43/1, 2

[56] References Cited

U.S. PATENT DOCUMENTS

| | | | |
|---|---|---|---|
| 2,959,354 | 11/1960 | Beck | 239/36 |
| 4,238,108 | 12/1980 | Muetterties | 251/6 |
| 4,506,806 | 3/1985 | Lincoln et al. | 222/175 |
| 4,667,430 | 5/1987 | Ziese, Jr. | 43/1 |
| 4,682,715 | 7/1987 | Reeves | 43/1 |

OTHER PUBLICATIONS

Advertisement; Tink's Hunting Lodge, McLean, Va., *Bowhunter*, Jan. 1986; 47268.
Advertisement; SCENT-SPENSE; North American Outdoor, Inc., Alma, Mich., p. 58, undated.

*Primary Examiner*—Nicholas P. Godici
*Assistant Examiner*—Carmine Cuda
*Attorney, Agent, or Firm*—William R. Price

[57] ABSTRACT

An animal liquid lure dispenser consists of a vial of liquid animal lure in open communication with a microdrip chamber. The microdrip chamber communicates with a dispensing tube, which dispenses the lure a drop at a time onto the floor of the forest. The device contains a flow control device for regulating the flow of lure through the apparatus. The apparatus is designed to be used in simulating, or with an animal "scrape" in the forest. The device is suspended from the branch of a tree, so that the lure drips at a regulated flow onto the real or simulated "scrape."

6 Claims, 5 Drawing Sheets

METHOD OF PREPARING AN ANIMAL LURING SITE

BACKGROUND OF THE INVENTION

This invention relates to an animal lure adapted for hunters and, more specifically, to an animal liquid lure dispenser.

FIELD OF THE INVENTION

The present invention relates to an animal liquid lure dispenser adapted to simulate a "scrape" made by white-tailed bucks. More specifically, this invention relates not only to the liquid lure dispenser, but to a method of simulating buck "scrapes."

DESCRIPTION OF THE PRIOR ART

Liquid animal lures, which rely on specific scents to attract particular animals, are well known. A type of buck lure used by hunters is a liquid which gives off the odor of a receptive estrus doe. This lure consists of the urine of a receptive estrus doe. The use of the buck lure, however, has not met with a great deal of commercial success because of its method of application. In many instances, the liquid is commonly used by saturating a wad of cotton with the liquid and carrying the saturated wad of cotton in the hunter's coat, so as to attract the buck to the hunter. The liquid has a very strong and rather unpleasant odor. Since the hunter carries the saturated wad of cotton in his pocket, the odor from the liquid permeates the hunter's clothing and provides the hunter's clothing with an unpleasant odor which is retained long after the hunting season is over. One method of applying the lure is to dispense the liquid lure through a conventional plastic squeeze bottle with a nozzle top. Therefore, the hunter squeezes the bottle to apply drops of the lure as he walks along the desired trail. Maintaining the desirable application rate while walking through the woods or along a trail can be a tedious chore for the hunter. Additionally, the advantageous application of the lure to the trail is overcome by the scent of the hunter himself. Therefore, the sparing application of the liquid along the trail is not sufficient to overcome the buck's natural apprehension of the human scent. Applicant is aware of U.S. Pat. No. 2,959,354, to Edward W. Beck, of Yeadon, Pa., who has disclosed a cup-shaped container, which has a tubular stem extending from the bottom of the container and a cover threadably fixed on a threaded rod, secured to the top of the cover so that the top of the container could be opened or closed upon rotation of the cover.

The container contained a liquid lure member, having the odor of a doe so that the container could be suspended in position and opened slightly to allow the scent of the doe's urine to permeate the area and thus lure the buck into the proximity.

Clark Lincoln and Norman Benzing, on the other hand, in U.S. Pat. No. 4,506,806, disclosed a container worn on the belt of the hunter, having a depending tube which trails along the ground and equipped with a valve so as to regulate a regular application of the doe's urine along the trail of the hunter. This latter procedure is known as a liquid trail lure.

SUMMARY OF THE INVENTION

According to the present invention, there is provided a dispenser for animal liquid lures which can be used to simulate the natural habitat of the deer and which can be set up so as to provide a buck "scrape." This scrape can either be a scrape made by the buck or a simulated scrape produced by the hunter. In any event, the apparatus of this invention is suspended from a branch overhanging the scrape and the doe's urine flows from a vial into a drip chamber and through a dispensing tube in slow, well-regulated drops. The dispenser is made so that it will dispense as little as one ounce of doe's urine for a period of up to 30 hours. Therefore, the hunter can set up the lure the night prior to the hunt and mask his scent with fox or skunk urine lure, so that the buck does not pick up the hated human scent. In this manner, the hunter can then approach the site the following morning and set up his blind, awaiting the approach of bucks.

DESCRIPTION OF THE PREFERRED EMBODIMENT

Figure 1:
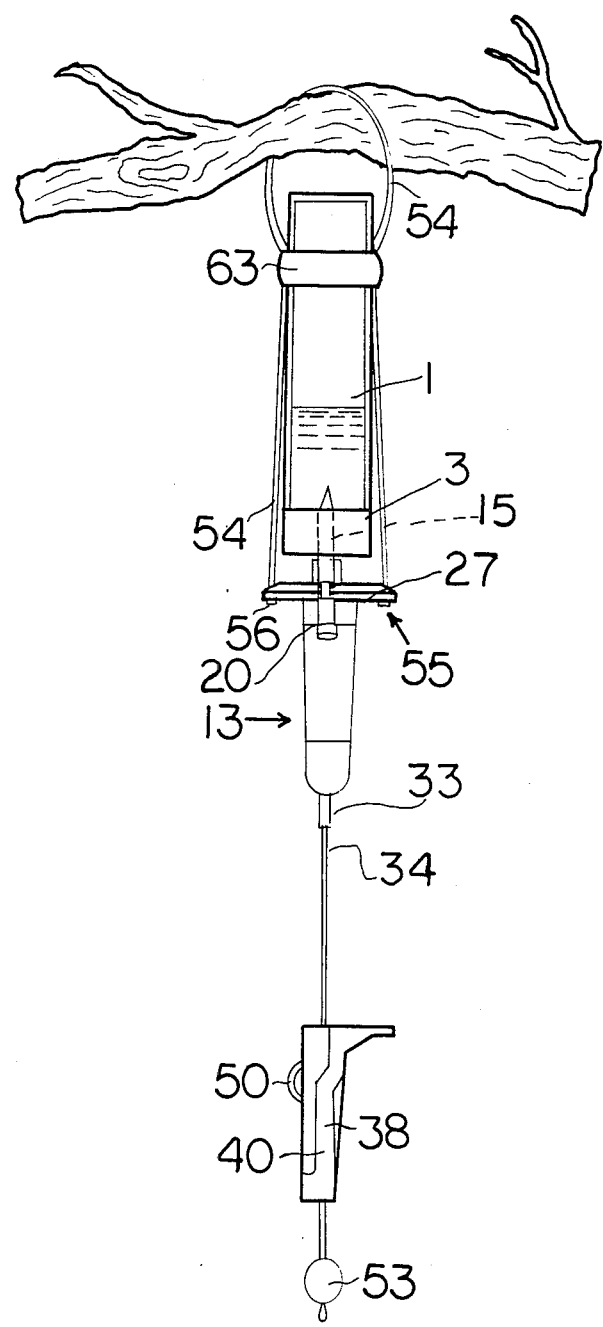
FIG. 1 is a side elevation of the apparatus of this invention, suspended from a tree limb, over a buck "scrape."
Figure 1:
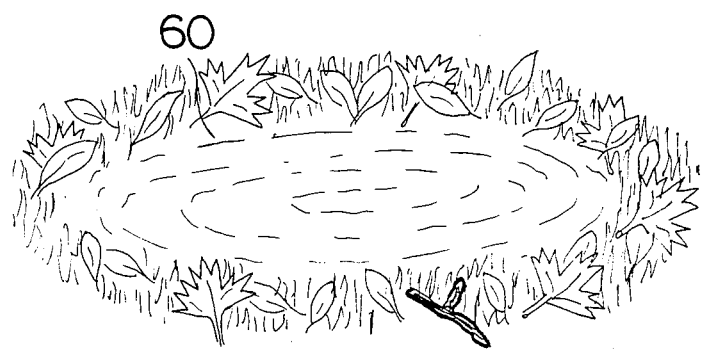

A buck "scrape" is a circular or oval patch of ground, made by a mature buck prior to the rut. The earth is torn up by bucks, who use their front feet to clear the piece of ground. Scrapes are from 12 inches in diameter to 3 feet. Most scrapes are made in a frenzy of pawing, as if the animal has opened a relief valve. The tracks show that the deer pivots around while making the scrape. The scrapes are usually made in trails that are heavily used by does. Almost all scrapes are made under low-hanging branches. A mature buck will make these all over his territory. The buck checks these at different times of the day and night.

The scrape is marked with the scent of the buck. The whitetailed deer have four external sets of glands: preorbital (tear duct), interdigital (between the hooves), tarsal (on the inner side of the hock) and metatarsal (on the feet). The buck will urinate in the scrape, letting the urine run down his leg. He will also rub the preorbital glands on the over-hanging branches above the scrape. Some bucks will chew the leaves on these branches to further leave his scent. A receptive doe will urinate in the scrape and browse around the area till the buck returns. If the buck that made the scrape is with a doe, he will not leave a hot doe to find another. Often, other bucks will check scrapes that they did not make. A receptive doe will walk with her tail straight out and slightly shifted to the right or left.

The apparatus of this invention is adapted to make use of existing scrapes or to simulate scrapes and to dispense a receptive estrus doe's urine, which is commercially available, into the scrape to attract the buck. The hunter will then set up a blind or will situate himself in a tree and wait for the buck, downwind of the scrape.

Referring now to the drawing, the apparatus consists of a vial 1, having a threaded neck 2, which contains a cap 8. A cap of this type is commercially available and can be carried easily by the hunter in his pocket without fear of leakage. The cap contains a threaded skirt 9 and solid top 10 and a liner (not shown).

Figure 7:
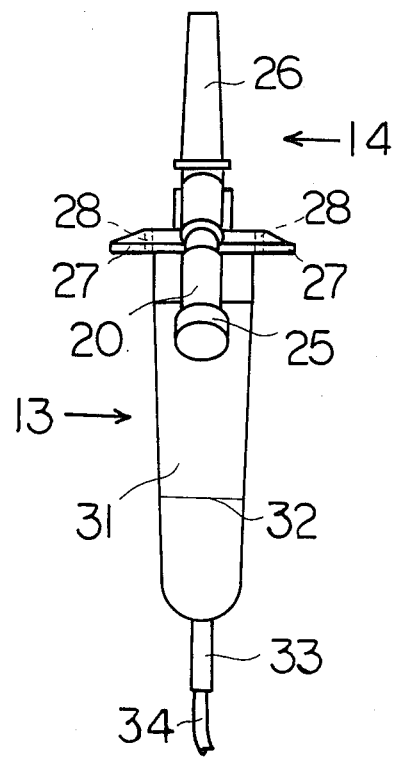
FIG. 7 is a side elevation turned 90° relative to FIG. 5, of the drip chamber of this invention.
Figure 8:
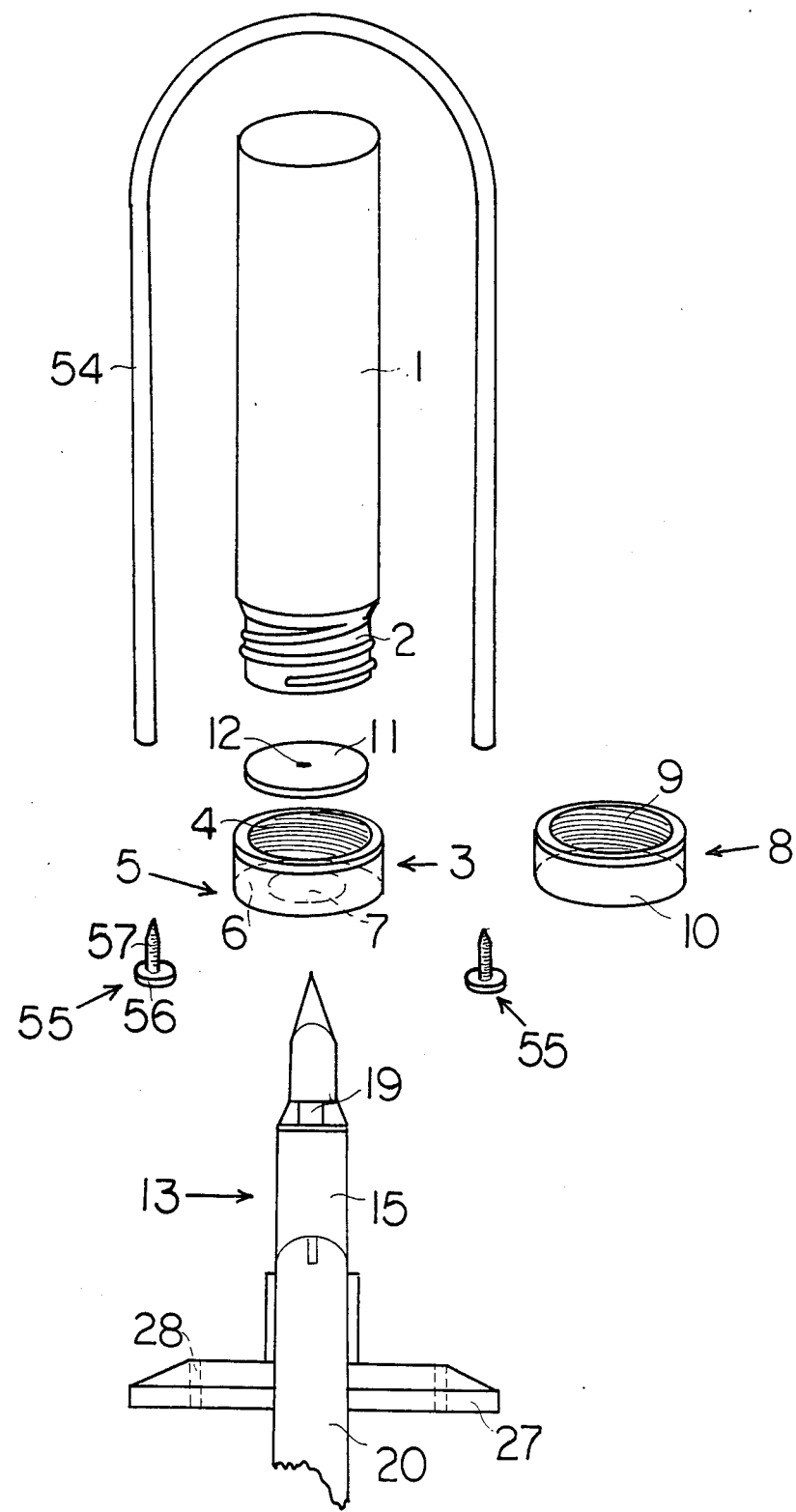
FIG. 8 is an fragmentary elevation of the hollow spike of the top portion of the drip chamber, illustrating the method of securing the suspending tube through the holes of the tab.
Figure 9:
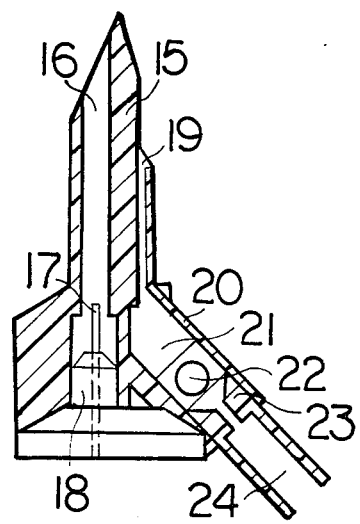
FIG. 9 is an exploded elevation of the top cap of the drip chamber, illustrating the inner workings of the hollow spike, in conjunction with the vial for containing the doe urine.

However, when utilized with the apparatus of this invention, the solid cap 8 is replaced with a cap 3, which again has a threaded skirt 4 and a top portion 5, having an annular flange 6, defining a central opening 7. A liner, preferably made of Teflon, 11 is fitted into the cap and it normally contains a hole 12 (see FIG. 9). The hollow spike 15 of the top of the microdrip apparatus 13, is inserted through the hole 12 of the Teflon liner 11. The hollow spike 15 is a part of the top 14 of the drip chamber and contains a fluid passage 16, which leads to a capillary tube 17, fixed in a support member 18. The other hole 19, along the side of the hollow spike 15, is an air passage, leading to a carbureting device 20, which contains a valve chamber 21, containing a ball bearing 22, which seats against a valve seat 23. The valve chamber 21 is in communication with the air inlet 24. The carbureting device 20 is normally covered with a carbureting device cover 25 and the hollow spike 15 of the top of the microdrip chamber is normally covered with a hollow spike cover 26. As illustrated, both in FIG. 1 and in FIG. 7, the top of the microdrip apparatus has two projecting tabs 27, each of which contains a hole 28.

Figure 3:
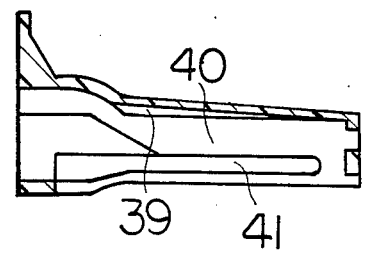
FIG. 3 is an illustration of the clamp member of this invention.
Figure 5:
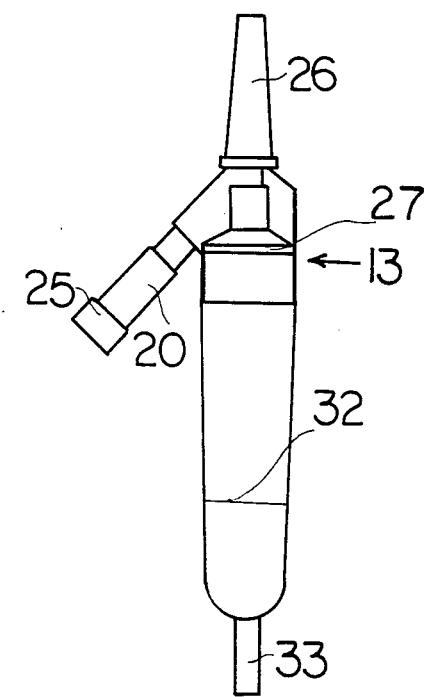
FIG. 5 is a side elevation of the drip chamber of this invention.
Figure 4:
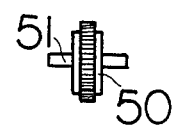
FIG. 4 is a frontal elevation of the roller used in conjunction with the clamp member.
Figure 6:
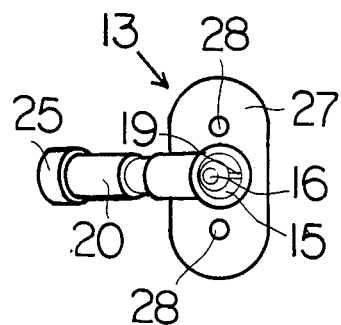
FIG. 6 is a top view of the drip chamber.

As is shown, the capillary tube 17 is in communication with the drip chamber 31. The drip chamber contains a scribed fill line 32 and terminates at its distal end with a nipple 33. A dispensing tube 34 is fixedly secured inside the nipple. The dispensing tube is trained through clamp member 38, which, as is shown in FIG. 3, has a beveled floor 39 and two upstanding walls 40, each of which contains a slot 41. The wheel member 50 is journaled in the slots 41, by means of pivot pins 51, so as to exert increasing pressure on the tube trained through the clamp 38. A weight 53, in the form of a round fishing sinker, is located at the distal end of the dispensing tube 34, so as to hold the apparatus perfectly vertically over the scrape.

Figure 2:
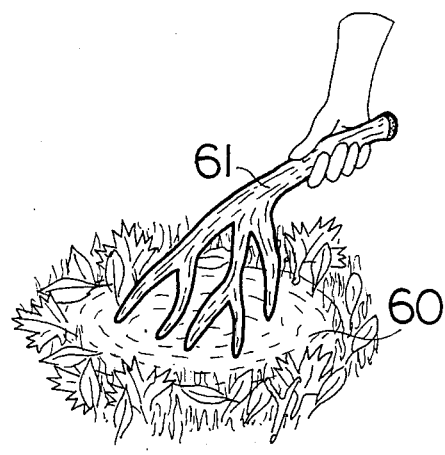
FIG. 2 is an illustration of a method of a hunter preparing a "scrape."

As is shown in FIG. 2, a simulated scrape 60 can be prepared by the hunter by use of his rattling antlers 61 or an abandoned or not-abandoned scrape can be utilized if one can be located. As previously indicated, the rut scrapes are almost always located under overhanging branches and the mature buck nibbles away on the twigs and leaves, so as to leave a scent from his saliva around the branches.

In this instance, however, the apparatus is hung over the branch, by releasing the flat-headed screw 55, by twisting the flat head 56 and removing the threaded shank 57 from the interior bore of the suspending tube 54. Thus, the one end of the tube can be removed from the hole 28 in the tabs 27 of the top of the drip chamber and the entire apparatus hung onto the branch. Thereafter, the suspending tube 54 is trained through hole 28 and the shank 57 of the flat-headed screw 55 is reinserted so that the flat head 56 is in engagement with the undersurface of the tab 27. Thereafter, a rubber band 63 is located near the bottom end of the inverted vial to hold the suspending tube vertically in suspension above the scrape 60.

By setting up the scrape the day or evening prior to the hunt, the hunter can mask his footsteps with a masking scent, such as fox urine or skunk urine, so that the human scent is not available around the site. Thereafter, on the next morning, the hunter can approach the site downwind and set himself up in the blind, ready to take his next buck.

As previously indicated, a vial of one ounce of doe's urine will last as long as 30 hours, which will allow a hunter two days or more in which to hunt the area.

How To Assemble

The scent is poured into the vial 1. Thereafter, liner 11 is placed into cap 3, flush against the annular flange 6 of the top 5. Cap 3 is then screwed onto the threaded neck 2 of vial 1. The hollow spike cover 26 is removed from the hollow spike 15 of the top 14 of the microdrip apparatus 13. The hollow spike is pushed through hole 12 of the Teflon liner 11 and into the vial 1. Wheel 50 is turned to close clamp 38. Thereafter, vial 1 is inverted and the carburetor cover 25 is removed. The drip chamber 31 is squeezed until the liquid lure is at the level of the scribed fill line 32. The suspending tube 54 is covered with rubber band 63 and thereby anchored to the bottom portion of vial 1. The suspending tube 54 is attached to the branch above scrape 60. (This may entail removal of the flat-headed screw 55 from the end of the suspending tube and training the free end of the suspending tube over the branch and thereafter reinserting the threaded shank 57 of the flat-headed screw 55 back into the bore of the suspending tube 54.) The wheel 50 of clamp 38 is now turned to open the clamp 38 and to regulate the flow of the lure through the dispensing tube 34. The drip chamber 31 is so regulated that four drops of the lure from the vial 1 through the capillary tube 17 into the drip chamber is equivalent to one drop out of the distal end of the dispensing tube 34. For this reason, one ounce of the lure can last for as long as 30 hours at the site of the scrape.

How to Remove and Disassemble the Apparatus

At the termination of the hunt, the apparatus is removed from the branch by removing the flat-headed screw 55 and the suspending tube 54 from hole 28, as previously indicated and the entire apparatus can be inverted, so as to allow any unused lure to run back into the vial. Thereafter, the cap 3 can be removed and the regular cap 8 can be placed on the vial, so that the lure can be placed in the hunter's pocket without fear of leakage. The drip chamber 31 can be rinsed out with water and placed back with the hunter's paraphernalia for reuse on another hunt.

While it is clear that this apparatus has been set up primarily for hunting deer, it can also be used for other animals, such as bear and the like.

Many modifications will occur to those skilled in the art from the description hereinabove given and such is meant to be illustrative in nature and nonlimiting, except so as to be commensurate in scope with the appended claims.

We claim:

1. A method of preparting a site for an animal lure, which comprises the steps of:
   A. selecting a site populated by the animals;
   B. suspending a vial of animal urine to an overhanging support at the site;
   C. dispensing the liquid animal urine into a drip chamber;
   D. regulating the flow of urine from said vial to said drip chamber;
   E. dispensing the liquid animal urine from said drip chamber into a dispensing tube, connected at its proximal end to siad drip chamber; and
   F. dispensing said animal urine in regulated drops onto the ground at the selected site.

2. A method of preparing a site, as defined in claim 1, in which said step of selecting a site includes selecting an existing buck scrape.

3. A method of preparing a site, as defined in claim 1, in which an immitation buck scrape is prepared by the hunter at the site selected.

4. A method of preparing a site, as defined in claim 1, in which the overhead support is a branch of an adjacent tree.

5. A method of preparing a site, as defined in claim 1, in which the liquid urine released from said vial is displaced by air through a carbureting device.

6. A method of preparing a site, as defined in claim 1, the improvement of incrementally deforming the dispensing tube and regulating the flow of liquid urine from said vial through said drip chamber and said dispensing tube.

* * * * *

UNITED STATES PATENT AND TRADEMARK OFFICE
CERTIFICATE OF CORRECTION

PATENT NO. : 4,773,177
DATED : September 27, 1988
INVENTOR(S) : Hanley Gray II and John F. Hendrickson It is certified that error appears in the above-identified patent and that said Letters Patent is hereby corrected as shown below:

Column 5, line 1, "preparting" should read --preparing--.

Column 5, line 15, "siad" should read --said--.

Signed and Sealed this

Twenty-eighth Day of February, 1989

Attest:

DONALD J. QUIGG

Attesting Officer

Commissioner of Patents and Trademarks